April 29, 1952 C. TOONE Re. 23,489

PROCESS OF MAKING CHEESE

Original Filed Nov. 1, 1946

Inventor:

Conrad Toone.

By Carl C. Batz,
Attorney.

Reissued Apr. 29, 1952

Re. 23,489

UNITED STATES PATENT OFFICE 23,489

PROCESS OF MAKING CHEESE

Conrad Toone, Pocatello, Idaho, assignor to Armour and Company, Chicago, Ill., a corporation of Illinois Original No. 2,520,183, dated August 29, 1950, Serial No. 707,182, November 1, 1946. Application for reissue August 29, 1950, Serial No. 182,027

4 Claims. (Cl. 99—116)

Figure 1:
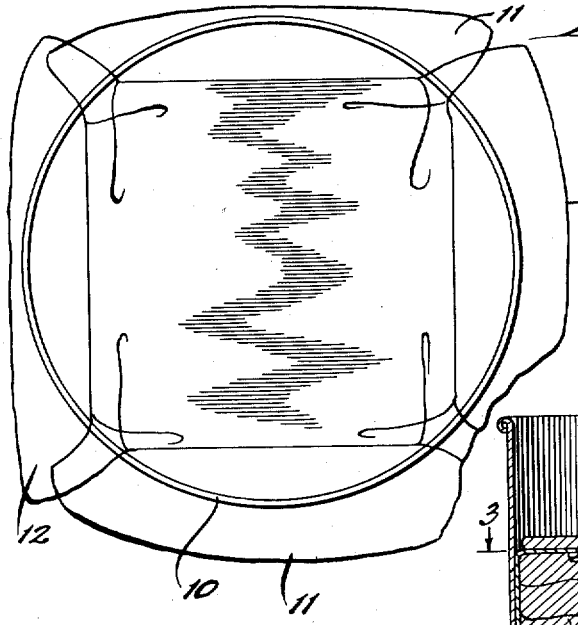

Matter enclosed in heavy brackets [ ] appears in the original patent but forms no part of this reissue specification; matter printed in italics indicates the additions made by reissue.

This invention relates to a process for making cheese.

In the usual commercial cheese manufacture, a coagulating agent, usually rennin, is added to milk to bring about coagulation of the casein. The curd thus formed is cut, cooked, and wheyed off, and the resulting curd product is ground, hooped, pressed, paraffined, and stored for varying lengths of time during which the curd takes on certain body characteristics normally associated with aged cheese. The aging or "ripening" of the cheese varies from eight or nine days in some specific processes to periods of eight or nine months for "long held" cheeses having more fully developed flavor. The hoops are lined with cloth and are filled with about 75 pounds of curd. The filled hoops are placed in a press and held overnight to set the curd. The next morning, the cloth-covered curd is knocked out of the hoops, held one day in a drying cooler, and then each piece is dipped in a vat of paraffin. The paraffined curd is then placed in the curing room and allowed to stay there for the aging period, after which the curd will have developed the desired body characteristics.

Body characteristics can be identified by melting the curd, and a curd which upon application of heat, and with the usual salt added, will melt to form a smooth free-flowing mass as distinguished from a stringy, ropy or solid mass, has fully developed body characteristics.

When, under the above practice, the cloth and paraffin coating were removed from the curd after the minimum of eight or nine days required for body development, there usually was a substantial amount of mold which had to be removed by trimming the outer surface of the piece. Also the task of removing the mold was one involving considerable time and labor, and the cutting off of substantial exterior portions of the cheese represented a serious loss.

An object of the present invention is to overcome the above-mentioned difficulties and to provide a simple method for the recovery of the cheese intact and without loss following the body-forming or ripening period. A further object is to provide a simple method involving substantially no extra expense, for eliminating the labor heretofore necessary in the cleaning of the curds while also preventing loss of product. Yet another object is to provide a process whereby enzymes may be employed for greatly shortening the cheese forming process while, at the same time, enabling the curds to be recovered without loss during the ripening period in which the enzyme is active. Another object of the invention is to provide a process which will eliminate the expensive steps of milling, pressing, hooping, removing hoops, dipping the portions into paraffin, and later removing paraffin and mold, together with other steps heretofore found necessary in the process of making cheese. A further object is to provide a process in which unmilled, unsalted curd is effectively treated through the use of air-impervious wrapping material so as to avoid the above-mentioned expensive steps while producing an excellent product ready for further processing. Other specific objects and advantages will appear as the specification proceeds.

I have discovered that the formation of mold during the period in which the curd is ripening may be wholly prevented by placing the curd in a box lined with a wrapping material which is substantially air-impervious or of low moisture-vapor-transmission rate, and then maintaining it sealed within the wrapping during the body-forming stage. The entire curd contents of the vat, which may be in the neighborhood of 1,000 pounds, may be transferred directly to the wrapping-lined box.

The box or form is lined with the substantially air-impervious wrapping and the curd transferred either entirely or in part from the vat directly into the lined box. The wrapping is then folded over the curd so as to entirely enclose it. A lid is then preferably placed over the form so as to rest on the wrapped curd and weights are placed on the top of the lid so as to maintain the folded top portion of the wrapper in sealed relation against the top of the curd. Nothing further is done until the period of body-forming or ripening is finished. At that time, the lid is removed and the wrapping is drawn away from the curd. It is found that the curd is in excellent condition and that it contains no mold. There is no necessity for the removal of paraffin or other material. The steps of milling, hooping, pressing, dipping in paraffin, removal of paraffin and mold, etc., are entirely eliminated.

The invention is illustrated in one embodiment by the accompanying drawing, in which—

Figure 2:
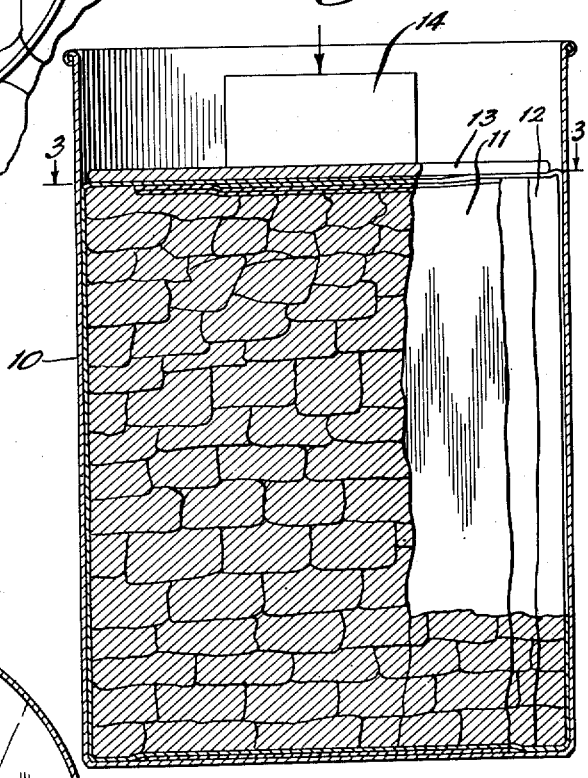

Figure 1 is a top plan view of a casing provided with wrappers arranged in accordance with our invention; Fig. 2, a broken vertical sectional view of the structure shown in Fig. 1; and Fig. 3, a view similar to Fig. 1 but showing the wrapping sheets folded over upon each other.

In the illustration given, 10 designates a casing of metal, wood or other suitable material adapted to receive the curd after removal from the vat. The casing 10 is lined with a pair of substantially air-impervious wrappings 11 and 12. The sheets, which may be of Vitafilm or any other suitable material, are laid within the casing at right angles to each other so that the two wrappings in this crossed relation entirely cover the interior of the box. It will be noted that the two sheets 11 and 12 overlap each other, as indicated best in Fig. 1.

Figure 3:
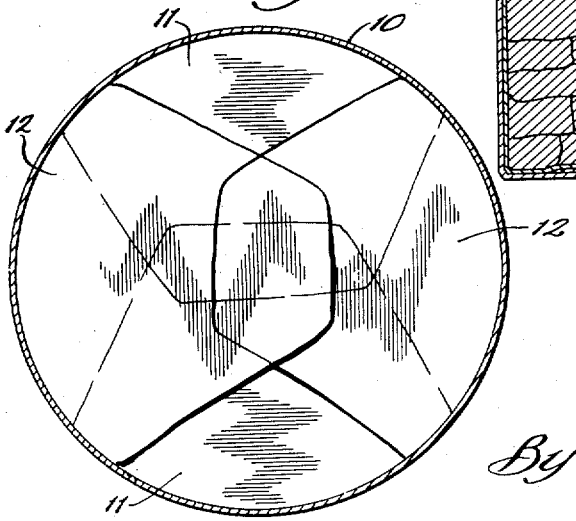

The curd contents of a vat, say, from 1,000 to 1,100 pounds, is transferred into the lined box and the top part of the wrappings or sheets is folded over so as to entirely enclose it, as indicated in Fig. 3.

Upon the folded-over sheets 11 and 12 is placed a follower member 13 which serves to maintain the folded-over portions in contact with the top portion of the curds during the period the curds are matting and the air between them is being expelled. If desired, a weight 14 may be placed upon the follower or disk 13. For some operations, it will be found that the disk 13 furnishes sufficient weight to maintain the overlapping portions of the sheets in proper position with respect to the curds and a weight will not be required. The weight of the cheese curd itself is highly effective in bringing about a matting of the curd pieces, in the closing of the voids between the pieces, and the expelling of air from the package. Weight 14 is, however, desirable in most cases for use in conjunction with the lid 13 because these members keep the folded-over top portions of the sheet in contact with each other and with the curds during the matting operation.

While the curd body is settling or matting, the overlapping sheets, which are held together by the lid 13, prevent the ingress of air while at the same time they permit the escape of air from the interior which is now under superatmospheric pressure. In other words, the folded wrappings at the top of the casing serve as a valve in permitting passage of air out of the interior of the wrapper container while preventing the inflow of air.

In the course of hours, the curd body becomes compact and lies in tight relation to the wrapping. The expelling of the air and the closing of the voids result in a substantially unitary curd body lying in tight relation with the wrappings. As a result, mold does not form upon the periphery of the body. After the mass has developed its cheese body characteristics, the wrapping strips may be peeled off and a clean cheese body is ready for further processing without trimming, etc.

Through the employment of the process steps described, the salting of the curd may be omitted. Thus, unsalted and unmilled curd is treated within the wrappings, and the cheese body develops more rapidly as a result of the substantial absence of salt. Further, if enzymes are added, it is found that the omission of the salt results in a more rapid enzyme action. A final unsalted, unmilled cheese is obtained, having no mold upon its exterior and having unusually good cheese body characteristics, the process requiring much less time than has heretofore been found necessary.

Instead of employing the double wrapping sheets described in the preceding paragraphs, it will be understood that a single wrapping sheet may be used or any multiple thereof may be employed.

It will be noted that in [our] *my* improved process, the curd remains in the wrapping and also in the rigid container or box throughout the curing period. This contrasts with the prior Cheddar practice in which the curd, after milling, is pressed to a solid mass in the cloth-lined hoops, is held in the hoops for about a day until set, and then removed from the hoops and encased in paraffin which remains on during the rest of the aging period.

It is believed that the low M-V-T or substantially air-impervious wrapping serves in several ways to bring about the improved results obtained. Being in contact with all exterior surfaces of the curd, it effectively prevents access of air to the curd, thus serving to inhibit activity of aerobic bacteria which produce mold. Neither the hoops nor the wax cloth wrapping of the prior practice were effective for this purpose. Secondly, the wrapping substantially retains moisture at the surface of the cheese mass so that the surface does not dry out and does not form the crust which heretofore has existed to a greater or lesser extent. As a result of maintaining the proper moisture conditions and inhibiting aerobic activity and holding the cheese mass in a uniform, compact shape, the best conditions are maintained for proteolytic enzyme action throughout the cheese mass, resulting in a uniformly developed body in all portions of the cheese.

The results are surprisingly good when the curd is wrapped as one large body as when the curd contents of an entire vat, say, about 1,000 or 1,100 pounds, are transferred to a lined container and wrapped as a unit.

In addition to the air-impervious or low moisture-vapor-transmission rate wrapper already mentioned, there are many other wrappers which prove to be satisfactory because of their low moisture-vapor-transmission rate.

After the wrapper has been removed, the curd may next be heated to pasteurization temperature (above about 150° F.) and any desired condiments may be added. The cheese, then in a molten condition, may be put into a container.

[Our improvements] *my improvement* may be practiced in connection with almost any specific kind of process where the curd is held to allow body characteristics to develop and [our improvements are] *my improvement is* especially effective when used in connection with procedures utilizing proteolytic enzymes to produce the desired body characteristics.

Enzymes, such as trypsin, pepsin, or erepsin, may be added to the milk or curd; preferably the enzymes are added before or at the time the rennin is added. Rennin is a coagulating enzyme rather than a proteolytic enzyme and is not operable for the body-producing function here referred to.

After the addition of the enzyme, [our] *my* improved process may be conducted as already described and the necessary holding periods may in about all instances be shortened to the time previously mentioned (in some cases somewhat shorter periods are allowed than those already set forth). The enzymes serve to hasten the body forming so that proper cheese body is quickly obtained.

When the wrappers are removed, the enzyme-developed curd is then heated to pasteurization temperature or above about 150° F. to effectively inactivate the enzymes and prevent their future action. In the absence of such heating step, the enzymes continue to act and tend to develop bitter flavors.

Though, as above stated, my conditions are especially effective in connection with the use of proteolytic enzyme, I wish to make it clear that their use it not limited to any process using the added enzymes.

Specific examples further illustrating the practice of [our] *my* improvements are given as follows:

EXAMPLE I 10,000 pounds of milk, testing 4.2% fat, were pumped into a 10,000 pound cheese vat; 100 pounds of starter having a high acidity were added. 30 ounces of rennet were added to the vat, and this coagulated the milk in a solid mass. The mass was then cut into small particles and cooked by steam, after which the whey was withdrawn. The curd was then cut into small slabs, removed from the vat, and placed in a lined form or box large enough to hold 1,100 pounds of cheese. The linings used were Vitafilm and consisted of a pair of sheets extending at right angles to each other and covering all of the sides of the square box. The wrapping material was then drawn over the cheese in overlapping relation and a follower placed upon it. A weight was set on top of the follower for about two hours to force out the air, and the cheese was then put in a cooler. Eight days later, the cheese was removed from the cooler, and upon removal of the wrappings was found to be free of mold and to be in excellent condition for reprocessing. During this period, the cheese had developed the desired cheese body.

EXAMPLE II 10,000 pounds of milk, testing 4% fat, were pumped into a 10,000 pound cheese vat. 85 pounds of starter having a high acidity were added, and later 3 ounces of rennet per 100 pounds of milk were added. The curd was cut into small cubes and the whey expelled. The curd was then cooked and shoveled into a form lined with Vitafilm, the sheets of the film being drawn over the top of the curd in overlapping relation. A follower was placed over the overlapped sheets, and a weight was applied to exclude air. Ten days later, the cheese had developed an excellent cheese body, and upon removal of the sheets was ready for reprocessing without further treatment.

The cheese body developed satisfactorily in the above examples in from eight to ten days. No trimming was required. The use of the process and the large form eliminated the steps of milling, lining hoops, knocking the cheese out of the hoops, paraffining the cheese, and stacking. It also eliminated cleaning time and loss of material. From the large form, all that was necessary was to pull the cheese out of the cooler, take off the side boards, peel off the Vitafilm, and the cheese was ready to be ground.

While in the foregoing specification I have set forth the details of the process for the purpose of illustrating the invention, it will be understood that such details may be varied widely by those skilled in the art without departing from the spirit of my invention.

I claim:

1. In a process for the preparation of cheese in which milk is coagulated to produce a curd [within a vat] and the curd is cut into pieces and the whey then drained from about the curd pieces, the steps of [shoveling] *transferring* the curd [pieces left standing in the vat directly from the vat] *directly from the place of draining* into a vessel lined with a substantially air-impervious wrapper having overlapping portions, sealing the overlapping portions of said wrapper against the ingress of air while permitting the escape of air, and holding the curd in said casing until cheese body characteristics are developed.

2. In a process for the preparation of cheese in which milk is inoculated with starter enzymes and coagulated to produce a curd [within a vat] and in which the curd is cut into pieces and the whey drained [from the vat and] from about the pieces of curd [therein], the steps of *transferring* [shoveling] the curd left standing in the *place where drained* [vat] directly into a vessel lined with a substantially air-impervious wrapper and having overlapping portions; applying a weight to the overlapping portions of said wrapper to seal the same against ingress of air while permitting the escape of air, and holding the curd in said casing until cheese body characteristics are developed.

3. In a process for the preparation of cheese in which milk is coagulated to produce a curd [within a vat] and in which the curd is cut into pieces and the whey drained [from the vat and] from about said curd pieces, the steps of *transferring* [moving] the curd bodily and directly *from the place of draining* into a container lined with a substantially air-impervious wrapper having overlapping portions and until the quantity in the container exceeds 1,000 pounds, sealing the overlapping portions of the wrapper about the curd against the ingress of air while permitting the escape of air, and holding the curd in said casing until cheese body characteristics are developed therein.

4. In a process for the preparation of cheese in which the milk is coagulated to produce a curd [within a vat] and in which the curd is cut into pieces and the whey drained [from the vat and] from about the curd pieces, the steps of transferring the curd pieces left standing *after draining* [in the vat] directly and bodily *from the place of draining* into a container lined with a plurality of substantially air-impervious wrappers, said wrappers having overlapping portions extending from the bottom of the container to the top thereof, placing a weight over the overlapped portions of the wrappers to seal the same against the ingress of air while permitting the escape of air between the overlapping portions thereof, and holding said curd sealed within said wrappers until cheese body characteristics are developed therein.

CONRAD TOONE.

REFERENCES CITED

The following references are of record in the file of this patent or the original patent:

UNITED STATES PATENTS

| Number | Name | Date |
|---|---|---|
| 1,981,986 | Bruhn | Nov. 27, 1934 |
| 2,109,093 | Rossman et al. | Feb. 22, 1938 |
| 2,424,693 | Jones | July 29, 1947 |